Feb. 9, 1943.  J. W. WATT  2,310,721
GLASSWARE FORMING MACHINE
Filed Oct. 31, 1940  2 Sheets-Sheet 1

Joseph W. Watt
INVENTOR

BY Rule & Hoge
ATTORNEYS

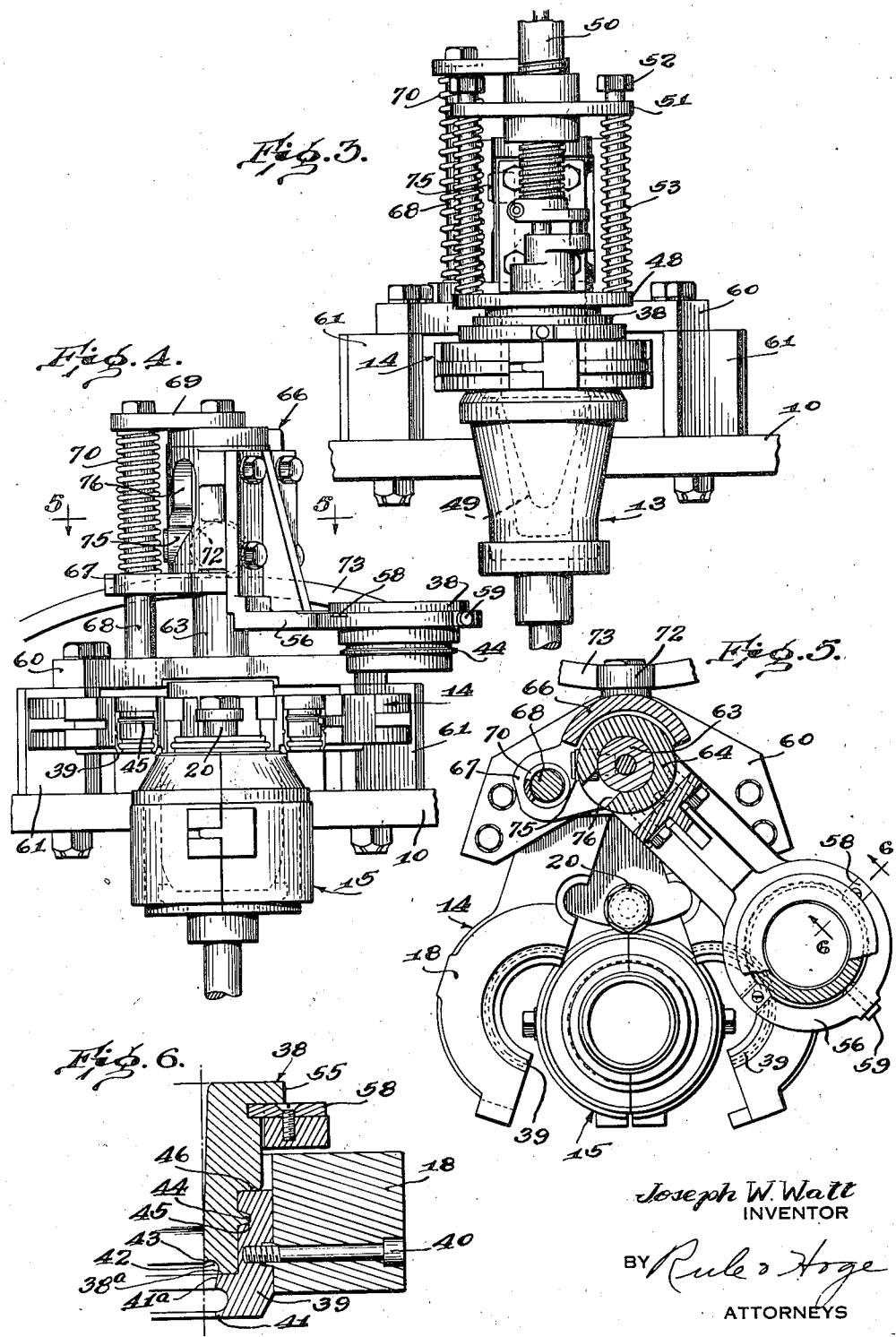

Patented Feb. 9, 1943

2,310,721

UNITED STATES PATENT OFFICE 2,310,721

GLASSWARE FORMING MACHINE

Joseph W. Watt, Oakland, Calif., assignor to Owens-Illinois Pacific Coast Company, a corporation of Delaware Application October 31, 1940, Serial No. 363,618

2 Claims. (Cl. 49—9)

The present invention relates to improvements in glassware forming machines and more particularly to means for producing ware having a high quality neck finish.

In the manufacture of articles of glassware such as jars or containers having a relatively large neck opening commonly called wide mouth, several major difficulties may at times be encountered. Such ware is quite generally formed by what is known as the "press and blow" method wherein a charge of molten glass is dropped into a one-piece blank mold on which a neck mold or split finish ring has been placed. A plunger is then lowered into the mold and under relatively high pressure, forces the glass into the neck mold and otherwise forms a compacted blank or parison. The contour of the plunger produces a cavity within the blank into which blowing air is later introduced to finally form the article. The cavity of the press mold is more or less tapered in form in order that the mold may be lowered away from the neck ring after removal of the pressing plunger, thereby leaving the parison suspended by the neck mold and exposed to the atmosphere. As the plunger is withdrawn, the glass may adhere slightly, thus pulling the surface chilled by the plunger out of place and causing the glass in the neck ring to become distorted. Such a defect cannot be detected until the finished jar has left the forming machine.

A finishing or blow mold is brought into register with the exposed parison and closed around it after which air under pressure is introduced to expand the blank to final form. While the exposed parison is suspended from the neck mold during the interval of transfer, there may be a tendency for the neck finish to contract away from the mold surface before it has thoroughly set or hardened, thus causing an out-of-round finish which is unsuitable for capping. Upon completion of the final blowing operation, the neck mold is removed and cooling air may then be directed into the jar before the blow mold is opened and the article removed from the machine.

Press and blow machines in general operate in an intermittent or step by step fashion, the fabricating operations taking place during the intervals of rest. The speed at which the machine may be operated is controlled mainly by the size and weight of the glass required for the article being fabricated and the resultant time necessary for proper cooling or chilling between operations so that the parison and particularly the neck finish can be held within the limit of standards previously ascertained to be satisfactory.

It is the primary object of this invention to avoid the above objections and provide means whereby the production rate of a machine of the above type may be materially increased without sacrificing the high quality sought for the ware.

It is another object of the invention to provide a secondary finish ring for cooperation with the standard neck ring and which forms a part thereof during fabrication of the glass.

An object in providing such a ring is to hold the glass pressed into the neck mold against the wall thereof during and following the withdrawal of the plunger.

Another object of the invention is to provide a supplemental finish ring which is adapted to aid in more rapidly cooling the neck finish and hold it against sagging or contracting to an out-of-round shape.

A further object is the provision of a one-piece secondary finish ring which is adapted to form a seamless sealing and capping surface on the neck finish of a jar or other container.

A still further object of the invention is the provision of mechanism for automatically moving a secondary finish ring into and out of operating position with the standard neck ring of a glassware forming machine of the press and blow type.

Other objects of the invention will be in part apparent and in part pointed out hereinafter.

In the drawings:

Fig. 3 is a front elevational view of the blank mold unit.

Fig. 4 is a view similar to Fig. 3, showing the parts in inoperative position.

Fig. 5 is a sectional plan view taken on line 5—5 of Fig. 4.

Fig. 6 is a detail sectional view taken on line 6—6 of Fig. 5.

Figure 1:
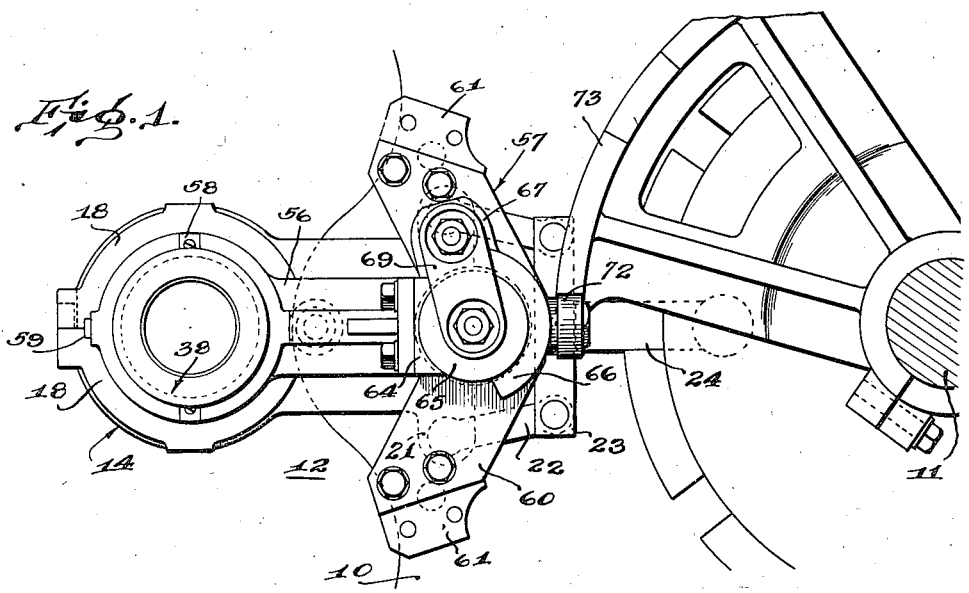
Fig. 1 is a plan view of one head of a glassware forming machine illustrating my invention in assembled position thereon.
Figure 2:
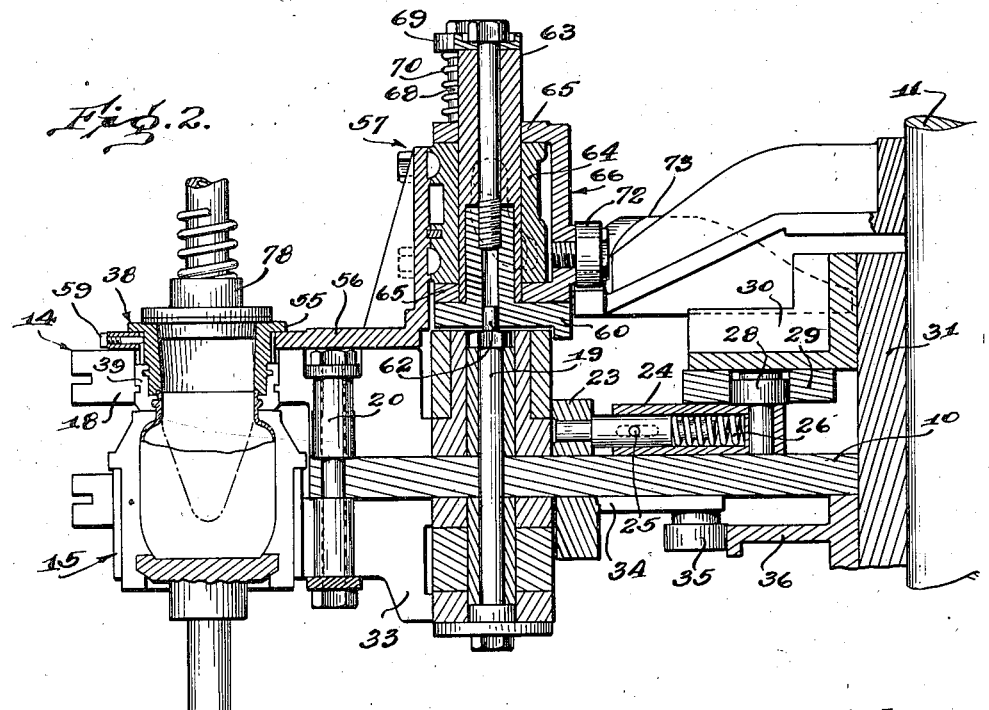
Fig. 2 is a vertical sectional view through a portion of the forming machine.

The present invention is illustrated in connection with a glassware forming machine of the press and blow type such as shown in the patent to Miller No. 1,529,661 dated March 17, 1925, to which reference may be had for a complete disclosure thereof. Referring to Figs. 1 and 2, the machine generally includes a mold table 10 supported for rotation upon a fixed central column 11 and movable intermittently by mechanism not shown. A plurality of mold groups 12 may be spaced around the periphery of the table in the manner shown in said Miller patent, each group including a one-piece blank mold 13 (Fig. 3), a partible neck mold 14, and a finishing or blow mold 15. Operating mechanism for the neck mold 14 comprises a pair of arms 18 (Figs. 1 and 2) hinged together on a vertical hinge pin 19 which extends through the table 10. The arms when in closed position, embrace a mold centering pin 20 also fixed to the table 10 for positively aligning the molds. The arms 18 are provided with outwardly extending ears 21 to which operating links 22 are pivoted. The links connect the arms 18 with a cross-head 23 which is yieldably held within a slide block 24 by means of a pin and slot connection 25 and a coil spring 26. A cam roller 28 for opening and closing the mold is carried by the slide block and runs in a cam 29 bolted to or otherwise formed on a plate 30 secured to a stationary sleeve 31 surrounding the column 11.

Finishing mold opening and closing mechanism includes arms 33 hinged on the pin 19 beneath the table. A slide plate 34 to which the arms are connected, carries a roller 35 for engagement with a cam 36 also secured to the sleeve 31.

Inasmuch as the mold groups are identical in construction and operation, only one will be described in detail. The present invention comprises in part, a one-piece ring 38 adapted to cooperate with the split finish ring 39 of the neck mold 14 as a secondary or supplemental finish ring (Figs. 2 and 6). The complementary semi-circular finish ring halves 39 are held within the arms 18 by bolts 40 in order that they may be separated to release the finally blown ware. The inner surface of the ring 39 is provided at the lower end with an inwardly projecting shoulder 41 which provides a seat for the ring 38 when assembled therewith. The lower inner corner of the ring 38 is provided with an annular groove 42, the outer wall 38ᵃ of which registers with and in effect forms a continuation of a molding face 41ᵃ on the inner wall of the shoulder 41. Thus there is provided a seamless sealing and capping surface for the jar finish. The groove is cut in a manner to produce an overhanging rim 43 or lip behind which the glass is forced during the pressing operation and held a sufficient period of time to insure permanent setting in the desired form. In order to provide a positive unyielding fit between the rings 38 and 39, an annular tapered rib 44 formed on the cylindrical outer wall of the ring 38 is adapted to engage in a complementary groove 45 in the ring 39. An annular shoulder 46 formed above the rib 44 is adapted to seat on the upper edge of the ring 39 and provide an additional bearing surface for the ring.

The internal diameter of the ring 38 corresponds substantially to the diameter of the plunger and serves as a "stripping" ring when the plunger is removed after the pressing operation. The upper portion of the inner wall of the ring is tapered slightly to aid in centering the plunger as it enters the mold.

Fig. 3 illustrates the plunger mechanism in pressing relation with the molds. The mechanism includes generally a bearing plate 48 through which the plunger tip 49 shown in dotted lines extends. The tip 49 is adjustably carried on a rod 50 to which a pressure plate 51 is attached. A pair of rods 52 threaded into the bearing plate 48 extends through the plate 51 and support coil pressure springs 53 which are placed under tension as the plunger is forced into the glass.

The ring 38 is provided at its upper end with an annular projecting flange 55 upon which the bearing plate 48 rests and also forms a shoulder by which the ring is supported on an arm 56 of holder mechanism 57. The ring 38 is held within the arm 56 by keys 58 engaging in a groove beneath the flange 55 and a set screw 59.

The holder mechanism (Fig. 2) comprises a base plate 60 mounted on supporting blocks 61 which are bolted to the table 10 equidistantly between adjacent mold groups. Each block serves as a support for adjoining holder units. The plate 60 straddles the neck mold hinge and a centering pin 62 in the hinge pin 19 serves to locate a vertical spindle 63 bolted to the plate about which the holder mechanism operates. The holder arm 56 is bolted to an operating sleeve 64 journalled on the spindle for up and down as well as rotary movement and is supported between end plates 65 of a reciprocating frame 66 or cage. Rotation of the frame 66 during operation is prevented by means of an ear 67 formed on the lower end plate 65 and a guide rod 68 passing therethrough and threaded into the plate 60. A tie plate 69 bolted to the guide rod and spindle supports the upper end of the rod and a coil spring 70 on the rod between the plate and the ear 67 maintains a downward pressure on the frame 66.

The frame 66 carries a cam roller 72 which at a predetermined time during the cycle of operation, engages a cam 73 mounted on the stationary column 11. The cam is arranged to elevate the frame 66 and holder before the molds reach the take-out station in order to provide free access to the take-out mechanism when the finishing mold is opened.

Swinging movement of the arm 56 and sleeve 64 is accomplished by means of a roller 75 (Figs. 2, 4, and 5) pinned to the spindle 63 and operating in a generally spiral slot 76 formed in the sleeve 64. The walls of the upper portion of the slot which engage the roller when the frame 66 is in the lowered position are vertical and parallel with the spindle so that during a portion of the upward travel of the frame, the holder and secondary finish ring 38 move vertically away from the opened neck mold. The lower portion of the slot is formed in a downwardly directed spiral so that further elevation of the frame 66 causes the arm and sleeve to rotate, thereby moving the ring 38 out of alignment with the molds as shown in Figs. 4 and 5.

Fig. 2 further shows a blow-head 78 in position on the ring 38 for finally forming a jar in the finishing mold.

In operation the frame 66 is lowered, bringing the ring 38 into operating position with the neck mold 14 which is then closed around it. The blank mold 13 is brought into register with the bottom of the neck mold and a charge of molten glass dropped therein. Indexing of the mold table brings the press mold unit to the pressing station where the plunger 49 is lowered into the mold to press the glass into the preliminary form of the blank or parison (Fig. 3) and then immediately withdrawn. During the next indexing of the mold table the blank mold is lowered from the pressing position thus leaving the parison suspended from the rings 38 and 39. It is while the parison is thus exposed to the atmosphere that sagging or contracting of the neck finish ordinarily occurs. By employing a secondary ring as shown particularly in Fig. 6, the plastic glass is forced into the groove 42, and the additional body of metal forming the ring tends to produce a more rapid and thorough chilling and setting of the rim of the neck finish. The overhanging lip of the groove prevents contraction of the glass away from the sides of the mold and consequent formation of out-of-round finishes.

The finishing mold is then closed around the bare blank and a blow-head 78 is lowered into position for the final blowing operation. On multi-head machines several blowing stations may be employed to insure thorough expansion of the blank and reduce the temperature of the glass below the point where sagging might occur when the mold is opened. As the mold leaves the final blowing station, the neck mold cam 29 begins withdrawing the slide block 24 to open the neck mold. As the neck mold becomes partially open, the roller 72 engages the cam 73 to raise the frame 66 and ring 38 and move them to inoperative position as the take-out station is approached.

As previously brought out, the more rapid chilling of the neck finish and extended period of support for the glass in the finish afforded by the use of the additional forming ring greatly lessens the time necessary for completely forming an article. Thus it will be seen, the speed of the forming machine may be substantially increased with the result that a greater volume of quality ware may be produced.

Modifications may be resorted to within the spirit and scope of the appended claims.

I claim:

1. In combination, a partible neck mold for a glassware forming machine of the press and blow type, mechanism for opening and closing said mold, said mold comprising coacting semi-circular halves adapted to form a portion of the neck finish of a container, a blank mold cooperating with said neck mold, a removable plunger for pressing a charge of glass in said mold to form a parison, a secondary finish ring adapted to cooperate with the neck mold and having an overhanging portion operable to retain the neck of a parison when pressed therein, against distortion after removal of the plunger, and means for moving said ring axially and laterally into and out of registration with the neck mold.

2. In combination, a partible neck mold for a glassware forming machine of the press and blow type, mechanism for opening and closing said mold, said mold comprising coacting semi-circular halves adapted to form a portion of the neck finish of a container, a coacting secondary finish ring, a holder for said ring, a support for the holder including a sleeve journalled for vertical and swinging movement on a vertically disposed rod, a cage partially enclosing said sleeve and arranged for vertical movement only on said rod, a cam roller on said cage, a cam for engaging the roller for raising and lowering the cage, said sleeve having a vertically and spirally arranged slot, and a roller carried by said rod and extending through said slot whereby movement of said cage by the cam causes vertical and swinging movement of the sleeve and holder to move said ring into and out of registration with said mold.

JOSEPH W. WATT.